United States Patent
Ohkubo

(10) Patent No.: US 7,113,307 B1
(45) Date of Patent: Sep. 26, 2006

(54) COLOR CORRECTION DEFINITION PRODUCING METHOD, COLOR CORRECTION DEFINITION PRODUCING APPARATUS, AND COLOR CORRECTION DEFINITION PRODUCING PROGRAM STORAGE MEDIUM

(75) Inventor: Akito Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 998 days.

(21) Appl. No.: 09/631,731

(22) Filed: Aug. 3, 2000

(30) Foreign Application Priority Data

Aug. 3, 1999 (JP) ................................. 11-219471
Jun. 9, 2000 (JP) ............................... 2000-173803

(51) Int. Cl.
*G06F 15/00* (2006.01)
*G03F 3/08* (2006.01)
*G06K 9/00* (2006.01)

(52) U.S. Cl. ...................... 358/1.9; 358/518; 382/162; 382/167

(58) Field of Classification Search ................ 358/1.9, 358/3.23, 3.24, 501, 518, 520, 525, 529, 358/500, 515, 517, 530, 522, 523, 524, 540; 382/167, 162, 165, 163, 164, 166; 345/589
See application file for complete search history.

(56) References Cited

U.S. PATENT DOCUMENTS

| | | | | |
|---|---|---|---|---|
| 5,111,285 A | * | 5/1992 | Fujita et al. ................. 358/500 |
| 5,305,119 A | * | 4/1994 | Rolleston et al. ............ 358/522 |
| 5,333,069 A | * | 7/1994 | Spence ........................ 358/517 |
| 5,339,176 A | * | 8/1994 | Smilansky et al. .......... 358/504 |
| 5,483,360 A | * | 1/1996 | Rolleston et al. ............ 358/518 |
| 5,521,723 A | * | 5/1996 | Madden et al. .............. 358/501 |
| 5,687,300 A | * | 11/1997 | Cooper ......................... 358/1.9 |
| 5,689,350 A | * | 11/1997 | Rolleston ...................... 358/504 |
| 5,852,454 A | * | 12/1998 | Kanematsu et al. ........... 347/43 |
| 6,043,804 A | * | 3/2000 | Greene ......................... 345/601 |
| 6,118,549 A | * | 9/2000 | Katougi et al. ............... 358/1.9 |
| 6,151,135 A | * | 11/2000 | Tanaka et al. ................ 358/1.9 |
| 6,330,085 B1 | * | 12/2001 | Yamamoto et al. .......... 358/538 |
| 6,360,007 B1 | * | 3/2002 | Robinson et al. ............ 382/162 |
| 6,417,891 B1 | * | 7/2002 | Cacciatore et al. .......... 348/649 |
| 6,529,640 B1 | * | 3/2003 | Utagawa et al. ............. 382/284 |
| 6,583,824 B1 | * | 6/2003 | Cacciatore et al. .......... 348/649 |
| 6,643,029 B1 | * | 11/2003 | Kumada et al. .............. 358/1.9 |
| 6,668,077 B1 | * | 12/2003 | Ohkubo ....................... 382/162 |

* cited by examiner

*Primary Examiner*—Kimberly Williams
*Assistant Examiner*—Charlotte M. Baker
(74) *Attorney, Agent, or Firm*—Sughrue Mion, PLLC

(57) ABSTRACT

There is produced a color correction definition for reproducing a suitable color correction common to a plurality of types of images. A color correction definition producing apparatus has a receiving section for receiving a plurality of LUTs (color correction definitions), a computing section for computing histograms used as an assembly of weight for sets of coordinate values constituting each of the LUTs, and a synthesizing section for synthesizing the plurality of LUTs received in the receiving section using the weight computed in the computing section.

15 Claims, 7 Drawing Sheets

COLOR CORRECTION DEFINITION PRODUCING METHOD, COLOR CORRECTION DEFINITION PRODUCING APPARATUS, AND COLOR CORRECTION DEFINITION PRODUCING PROGRAM STORAGE MEDIUM

BACKGROUND OF THE INVENTION

1. Field of the Invention

The present invention relates to a color correction definition producing method of producing a color correction definition defining the association between coordinate values on a color space corresponding to colors before and after the color correction, a color correction definition producing apparatus, and a color correction definition producing program storage medium, which is incorporated into a computer system, storing therein a color correction definition producing program causing the computer system to operate as the color correction definition producing apparatus.

2. Description of the Related Art

In a technical field of printing, a photograph and the like, in the event that an image on a reversal film is transferred onto a printing paper or a photographic paper to make a printed matter or a photograph, it often happens that an operator applies a color correction to form a high quality of image having the tone of a color, which is visually preferable for a person, on the printed matter or the photograph.

Hitherto, for forming such a high quality of image, there is use a specified system for producing a printed matter or a photograph to optimize the system in accordance with experience of an operator of the system.

For example, in case of the printing, when an image on a reversal film is read by a scanner, image data from the scanner is corrected. An image is printed on a printing paper with printing ink in accordance with the corrected image data, so that a preferable tone of color image is produced. At that time, a correction parameter for correcting the image data derived through the scanner is optimized in accordance with know-how based on the experience of an operator of the scanner, taking into consideration properties of the system in its entirety including printing papers, printing ink and the like. That is, a know-how of image formation, in which an image having a preferable tone of color is formed from an image on a reversal film, is possessed by the operator of the scanner. Here, it is assumed that the operator of the scanner optimizes the correction parameter for a combination of a certain film and printing ink so that an image having a preferable tone of color is obtained. However, in the event that the film and/or the printing ink are replaced by other film and/or printing ink, the correction parameter will be changed to an inappropriate correction parameter. Thus, in this case, there is a need to optimize the correction parameter again.

On the other hand, in case of the photograph, a reversal film is loaded on a laboratory system and adjusted light for exposure is projected onto the loaded reversal film, so that a corrected image is obtained. The corrected image thus obtained is printed on a printing paper to form an image having a preferable tone of color. At that time, a balance among R light, G light and B light for the exposure and an exposure time are optimized by an operator of the laboratory system and an automatic control mechanism of the laboratory system, taking into consideration properties of the system in its entirety including films, a light source, printing papers and the like. Further, also with respect to a combination of a sort of a film and a sort of a printing paper, there is selected such an optimum combination that a preferable tone of color image can be obtained. That is, a know-how of image formation, in which an image having a preferable tone of color is formed, is possessed by the operator of the laboratory system, a maker of the laboratory system and a maker of the film. Here, it is assumed that an exposure time or the like is optimized for a combination of a certain film and a certain printing paper so that an image having a preferable tone of color is obtained. However, for example, in the event that the film is replaced by another film developed newly, the combination of the film and the printing paper and the exposure time will be inappropriate for the new film. Thus, also in this case, there is a need to optimize the exposure time and the like again.

Thus, in both the cases of the printing and the photograph, there is a need to do over again an optimization to form an image having a preferable tone of color, whenever a film and the like is replaced by a new type of one according to a development of products.

Further, recently, as digital technology advances, it is increased that a transfer of images is performed among different industries and media. For example, in the event that instead of distribution of printed papers, images of the printed matter appears in a home page of an internet, the image of the printed matter will be converted into an image of a television, which is not so related to the printing industry hitherto. Further, for example, it begins that one shot of an image photographed by a home video is printed out by a printer of a personal computer, or outputted on a printing paper for a photograph. In the event that such a transfer of images is performed, it is desired that a high quality of image having a preferable tone of color as mentioned above is obtained at the received end of the image. However, according to the prior art, the above-mentioned know-how is merely allowed to be used only in the individual industries such as the printing industry and the photographic industry, but is not allowed to be used in a different industry on a common basis.

In order to solve the above-mentioned problems, there is considered a method in which colors of images before and after the color correction and image data are derived by an operator and the like, so that a know-how possessed by the operator and the like is extracted in form of a color correction definition such as a Look Up Table (LUT) which defines the association between a color of an original image and a color of an image after the color correction.

However, in the event that an operator performs a data operation, the operator performs an operation based on the original image. For example, in the event that the original image is concerned with a portrait image, the operator performs such an operation that an image wherein skin color is clear can be obtained, and in the event that the original image is concerned with a landscape image, the operator performs such an operation that an image wherein colors of leaves and color of the sky are clear can be obtained. Thus, according to the color correction definition extracted in accordance with the way as mentioned above, it is possible to reproduce an adequate color correction for colors included in the original image. However, it is not always expected that it is possible to reproduce an adequate color correction for colors other than the colors included in the original image. In other words, in order to apply an appropriate color correction to the respective one of the various types of images, there is a need to use in different ways the color correction definition depending on the respective one of the various types of images.

SUMMARY OF THE INVENTION

In view of the foregoing, it is an object of the present invention to provide a color correction definition producing method capable of producing a color correction definition to reproduce an adequate color correction common to a plurality of sorts of images, a color correction definition producing apparatus, and a color correction definition producing program storage medium storing therein a color correction definition producing program causing a computer system to operate as the color correction definition producing apparatus.

To achieve the above-mentioned object, the present invention provides a color correction definition producing method comprising:

a receiving step of receiving a plurality of color correction definitions each for defining an association among coordinate values on a color space with respect to colors before and after color correction between an original image and a modified image subjected to a color correction for the original image;

an applying step of applying weight to the color correction definitions derived in said receiving step; and a synthesizing step of synthesizing a plurality of color correction definitions derived in said receiving step in accordance with weight applied in said applying step.

Here, it is acceptable that the applying means applies to the color correction definitions weight for each color correction definition, weight for each color area on a color space, or weight for each set of coordinate values defined in association by the associated color correction definition.

According to the color correction definition producing method of the present invention, a plurality of color correction definitions are synthesized in accordance with weight of the color correction definitions. Thus, this feature makes it possible to synthesize the color correction definitions reproducing a suitable color correction for any of images corrected in color suitably by color corrections reproduced by a plurality of original color correction definitions synthesized.

In the color correction definition producing method according to the present invention as mentioned above, it is preferable that said receiving step receives a plurality of color correction definitions in such a manner that the plurality of color correction definitions are associated with color corrections associated with a predetermined plurality of original images, and said applying step applies weight to the color correction definitions in accordance with a relative importance of the original images with which the color correction definitions are associated.

As mentioned above, in the event that a know-how for color correction through operation of an operator referring to the tone of color and the like of an original image is extracted to produce color correction definitions, the produced color correction definitions can reproduce the color correction optimum to the original image referred to. A plurality of color correction definitions thus produced through the extraction of such a know-how are synthesized in accordance with a degree of importance of the original images used at the time of the extraction of those color correction definitions. This feature makes it possible to produce a color correction definition reproducing a color correction capable of suitably correcting colors of any original images.

In the color correction definition producing method according to the present invention as mentioned above, it is preferable that said applying step applies weight for a plurality of color areas on the color space to the color correction definitions.

Further, in the color correction definition producing method according to the present invention as mentioned above, it is preferable that said applying step applies to the color correction definitions weight for each set of coordinate values defined in association therebetween by the plurality of color correction definitions derived in said receiving step, and said synthesizing step performs a mapping of the sets among the plurality of color correction definitions, and synthesizes the mutually associated sets in accordance with weight applied in said applying step.

In the comparison of some color correction definitions with one another, in some cases, it happens that color areas capable of reproducing a suitable color correction are mutually different. For this reason, to synthesize a plurality of color correction definitions, it is preferable that weight for each set of coordinate values defined in association by the associated color correction definition, or weight for each color area is determined and applied. And sets of coordinate values are associated with the plurality of color correction definitions, and the associated sets are synthesized in accordance with weight of the sets or weight of the color areas. This feature makes it possible to produce a color correction definition reproducing a suitable color correction over wide areas on the color space.

To achieve the above-mentioned object, the present invention provides a color correction definition producing apparatus comprising:

receiving means for receiving a plurality of color correction definitions each for defining an association among coordinate values on a color space with respect to colors before and after color correction between an original image and a modified image subjected to a color correction for the original image;

applying means for applying weight to the color correction definitions derived in said receiving means; and synthesizing means for synthesizing a plurality of color correction definitions derived in said receiving means in accordance with weight applied in said applying means.

To achieve the above-mentioned object, the present invention provides a color correction definition producing program storage medium storing therein a color correction definition producing program comprising:

receiving means for receiving a plurality of color correction definitions each for defining an association among coordinate values on a color space with respect to colors before and after color correction between an original image and a modified image subjected to a color correction for the original image;

applying means for applying weight to the color correction definitions derived in said receiving means; and synthesizing means for synthesizing a plurality of color correction definitions derived in said receiving means in accordance with weight applied in said applying means.

Incidentally, with respect to the color correction definition producing program storage medium and the color correction definition producing apparatus referred to in the present invention, only the basic embodiments are shown. It is noted, however, that the reason why this is to do so is for avoiding the redundant description. It should be noticed that the color correction definition producing program storage medium and the color correction definition producing apparatus referred to in the present invention include not only the color correction definition producing program storage medium and the color correction definition producing apparatus according to the basic embodiments as mentioned above, but also various types of color correction definition producing program storage medium and color correction definition producing apparatus corresponding to the various embodiments of the color correction definition producing method as mentioned above.

Further, in the color correction definition producing apparatus and the color correction definition producing program storage medium of the present invention as mentioned above, as to naming of the structural elements of those apparatus and medium, the same names such as the receiving means and the applying means are applied. It is noted that in case of the color correction definition producing apparatus, it indicates a combination of software and hardware for providing such a function, and in case of the color correction definition producing program storage medium, it indicates only a software for providing such a function.

DETAILED DESCRIPTION OF PREFERRED EMBODIMENTS

Embodiments of the present invention will be described with reference to the accompanying drawings.

Figure 1:
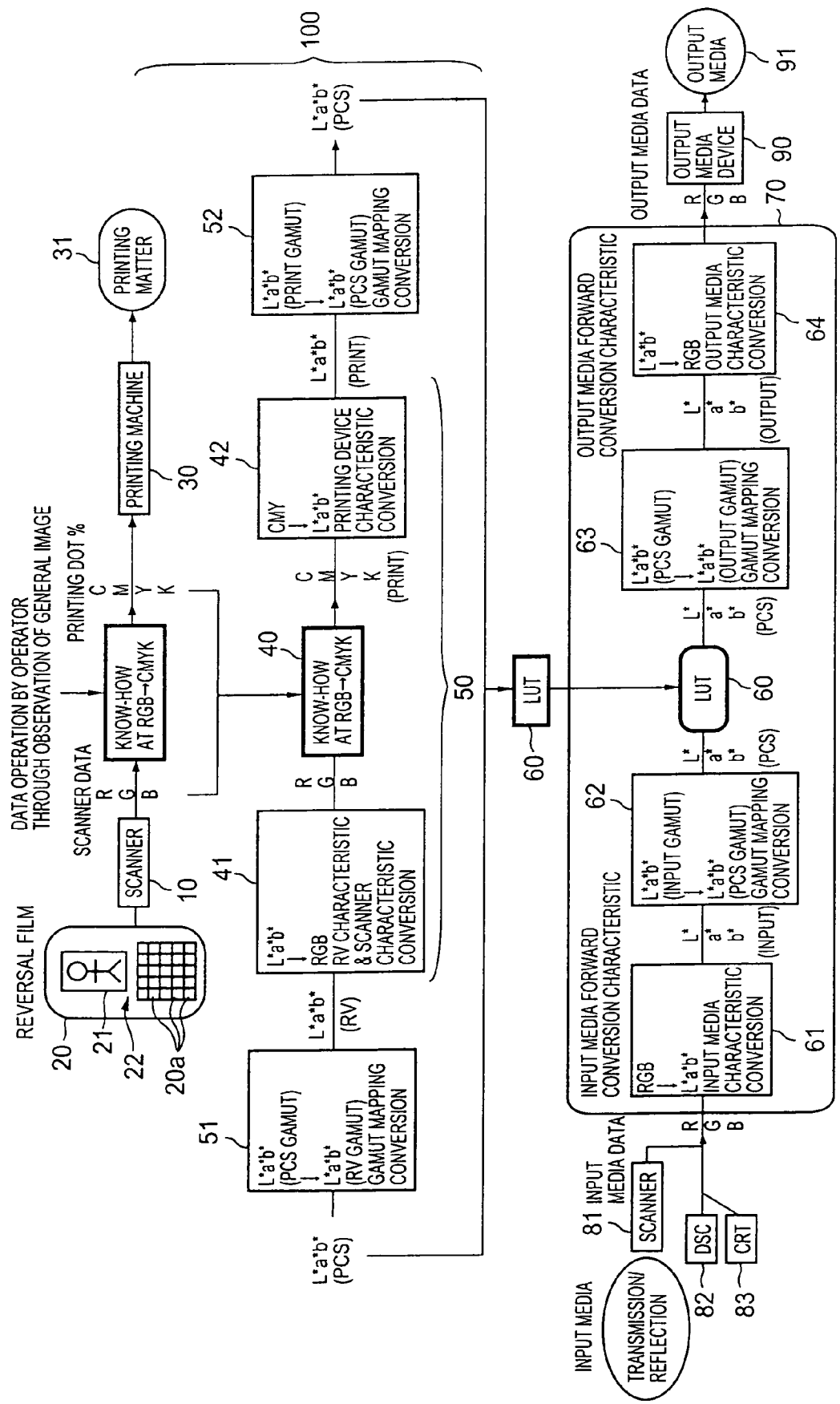
FIG. 1 is a view useful for understanding a color correction method which is a premise for application of embodiments of the present invention.

FIG. 1 is a view useful for understanding a color correction method which is a premise for application of embodiments of the present invention.

The color correction method relates to a method in which a know-how for an image formation possessed by an operator of a scanner 10 is extracted to perform a color correction using the extracted know-how.

According to the color correction method, first, the scanner 10 scans a general image 21 and a color chart 22, which are formed on a reversal film 20 of a type referred to as an "RV film A", to output RGB data. The operator of the scanner 10 operates the RGB data representative of colors of the general image 21 and the color chart 22 in accordance with the tone of color of the general image 21 formed on the reversal film 20 by a know-how obtained through one's experience, so that printing dot % CMYK. The printing dot % CMYK thus generated is fed to a printing machine 30 so that an image, wherein the general image 21 is subjected to a color correction for the preferable tone of image, is printed on a printing matter 31.

In the above-mentioned procedure, the RGB data outputted from the scanner 10 and the printing dot % CMYK thus generated through the operation are obtained for each of patches 22a constituting the color chart 22, and thus there is obtained a know-how 40 for converting the RGB data outputted from the scanner 10 into the printing dot % CMYK. The know-how 40 thus obtained corresponds to one in which a know-how for an image formation by the operator of the scanner 10 is extracted, but depends on color characteristics of the reversal film 20, characteristics in which image colors are converted into RGB data by the scanner 10, and characteristics in which printing dot % CMYK is converted into printing colors by the printing machine 30 and the like. For this reason, there are combined a know-how 40 for converting RGB data into printing dot % CMYK, RV characteristic & scanner characteristic conversion 41 for converting CIELAB values L*a*b* corresponding to colors on the reversal film 20 into RGB data outputted from the scanner 10, and a printing device characteristic conversion 42 for converting the printing dot % CMYK into CIELAB values L*a*b* corresponding to colors of an image on a printing matter, so that there is obtained a know-how 50 for converting the CIELAB values L*a*b* corresponding to colors on the reversal film 20 into CIELAB values L*a*b* corresponding to colors on the printing matter. The know-how 50 is independent of the color characteristics of the reversal film 20. Hereinafter, the CIELAB values L*a*b* are summarized as Lab. Further, the CIELAB values L*a*b* correspond to coordinate values of a CIELAB color space.

The RV characteristic & scanner characteristic conversion 41 can be obtained in such a manner that color of each of the patches 22a of the color chart 22 on the reversal film 20 is measured, and an image on the color chart 22 is read by the scanner 10 to derive RGB data corresponding to the respective patches 22a. The printing device characteristic conversion 42 can be obtained in such a manner that the printing dot % is fed to the printing machine 30, for example, in units of 10% such as 0%, 10%, 20%, . . . 100%, and colors on the printing matter 31 are measured.

By the way, the know-how 50, which is independent of the color characteristics of the reversal film 20, is to convert coordinate values Lab (RV) within the color reproduction area of the reversal film 20 into coordinate values Lab (printing) within the color reproduction area of the printing machine 30. Therefore, in the event that the know-how 50 is used to perform a color correction for an image photographed by a digital still camera and an image formed on a CRT display for instance, there is a possibility that such an inconvenience that a know-how for a color correction is not reproduced owing to a difference between the color reproduction area of the CRT display and the like and the color reproduction area of the reversal film 20 and the like.

For this reason, here, in order to avoid such an inconvenience due to a difference between the color reproduction areas, a gamut mapping conversion, in which coordinate values within a certain color reproducing area (gamut) are converted into coordinate values within another color reproducing area (gamut), in a state that an impression of a color of an image is maintained, is combined with the know-how 50. The gamut mapping conversion is a reversible conversion and also a conversion that two color reproducing areas are associated with one another in their entirety. The gamut mapping conversion can be defined by an LUT type of gamut conversion definition.

As mentioned above, the know-how 50, which is independent of the color characteristics of the reversal film, is combined with a gamut mapping conversion 51, in which coordinate values Lab (PCS) within the standard color reproducing area PCS are converted into coordinate values Lab (RV) within the color reproducing area of the reversal film, and a gamut mapping conversion 52, in which coordinate values Lab (printing) within the color reproducing area of the printing are converted into coordinate values Lab (PCS) within the standard color reproducing area PCS. Thus, it is possible to obtain a know-how 60 representative of a color correction conversion for converting coordinate values before the color correction into coordinate values after the color correction within the standard color reproducing area PCS, which is independent of the color reproducing areas of the reversal film 20 and the printing machine 30. Thus, an LUT 60 consisting of sets of coordinate values before and after the color correction conversion, which corresponds to the know-how 60 thus obtained, is produced and incorporated into a computer system 70. The LUT 60 is an example of the color correction definition referred to in the present invention, and corresponds to one in which a know-how of an operator of the scanner 10 is extracted independently of color characteristics and color reproducing areas of the reversal film 20 and the printing machine 30. The color correction definition referred to in the present invention is regardless of type thereof. Any one is acceptable, as the LUT, which defines a conversion corresponding to the know-how, for example, a function equation and a matrix. Hereinafter, the explanation will be continued assuming that the LUT is used to extract the know-how.

After the LUT 60 is incorporated into the computer system 70, for example, fed to the computer system 70 are input media data obtained in such a manner that an image formed on input media such as a reversal film and a reflection print (for example, photograph) is read by a scanner 81, input media data representative of colors of an image photographed by a digital still camera 82, and input media data representative of a color of an image produced and edited on a CRT display 83. As a format of the input media data, there may be considered CMY data and RGB data. Here it is assumed that RGB data is inputted.

Thereafter, first, there is performed an input media characteristic conversion in which entered RGB data, is converted into coordinate values Lab (Input) of the CIELAB color space corresponding to the color of the image on the input media. The input media characteristic conversion is defined by an input media characteristic conversion definition 61 based on input characteristics representative of a relation between color of an image on the input media and RGB data for input devices, according to the input devices 81, 82, and 83 associated with the entered RGB data. And there is performed a gamut mapping conversion for converting coordinate values Lab (Input) within the color reproducing areas of the input devices 81, 82, and 83 into coordinate values Lab (PCS) within the standard color reproducing area PCS. The gamut mapping conversion is defined by a gamut conversion definition 62.

Then, the LUT 60 converts coordinate values Lab (PCS) within the standard color reproducing area PCS to coordinate values Lab (PCS) corresponding to a preferable tone of color within the standard color reproducing area PCS.

Thereafter, there is performed a gamut mapping conversion for converting coordinate values Lab (PCS) within the standard color reproducing area PCS into coordinate values Lab (Output) within the color reproducing area of an output device 91 such as a printing paper and the like. The gamut mapping conversion is defined by a gamut conversion definition 63. Finally, the coordinate values Lab (Output) derived through conversion by the gamut mapping conversion defined by the gamut conversion definition 63 are converted into the RGB data for an output device 90 in accordance with an output media characteristic conversion defined by an output media characteristic conversion definition 64 based on output characteristics representative of a relation between the RGB data for the output device 90 and color outputted on the output device 91 by the output device 90. Here, as the output media 91, other than the printing paper, there are considered a printed matter, a CRT display and a reversal film.

When the RGB data thus outputted is fed to the output device 90, an image having a preferable tone of color is produced on the output media 91. The color correction to obtain an image having such a preferable tone of color may be reproduced regardless of input and output characteristics of the input devices 81, 82 and 83 and the output device 90. In other words, it is possible to implement a wide use of color correction system independent of the input devices and the output device.

By the way, an operator of the scanner 10 operates RGB data referring to the general image 21 formed on the reversal film 20 to perform such a color correction that for example, color of skin of a person becomes a "beautiful" skin color, or color of the sky and the green of a leaf become "beautiful" sky color and green, respectively. However, it is general that a certain image is formed with only colors of part of colors readable for the scanner 10. Accordingly, even if there is performed such an operation that colors including in the image offer a preferable tone of color so that a color correction definition to reproduce a color correction applied to the image is extracted, it is not always expected that another image, which includes colors not included in the image, is subjected to a color correction for a preferable tone of color. Nevertheless, it may be interpreted that data operation made referring to a certain image merely omits data operation for correcting colors not included in the image to a preferable tone of color, and on a theory, it is considered that there exist data operation and color correction that various types of images are corrected to a preferable tone of color.

In view of the foregoing, as will be described hereinafter, according to an application of the present invention, there is produced a color correction definition capable of reproducing a suitable color correction common to a plurality of types of images.

Figure 2:
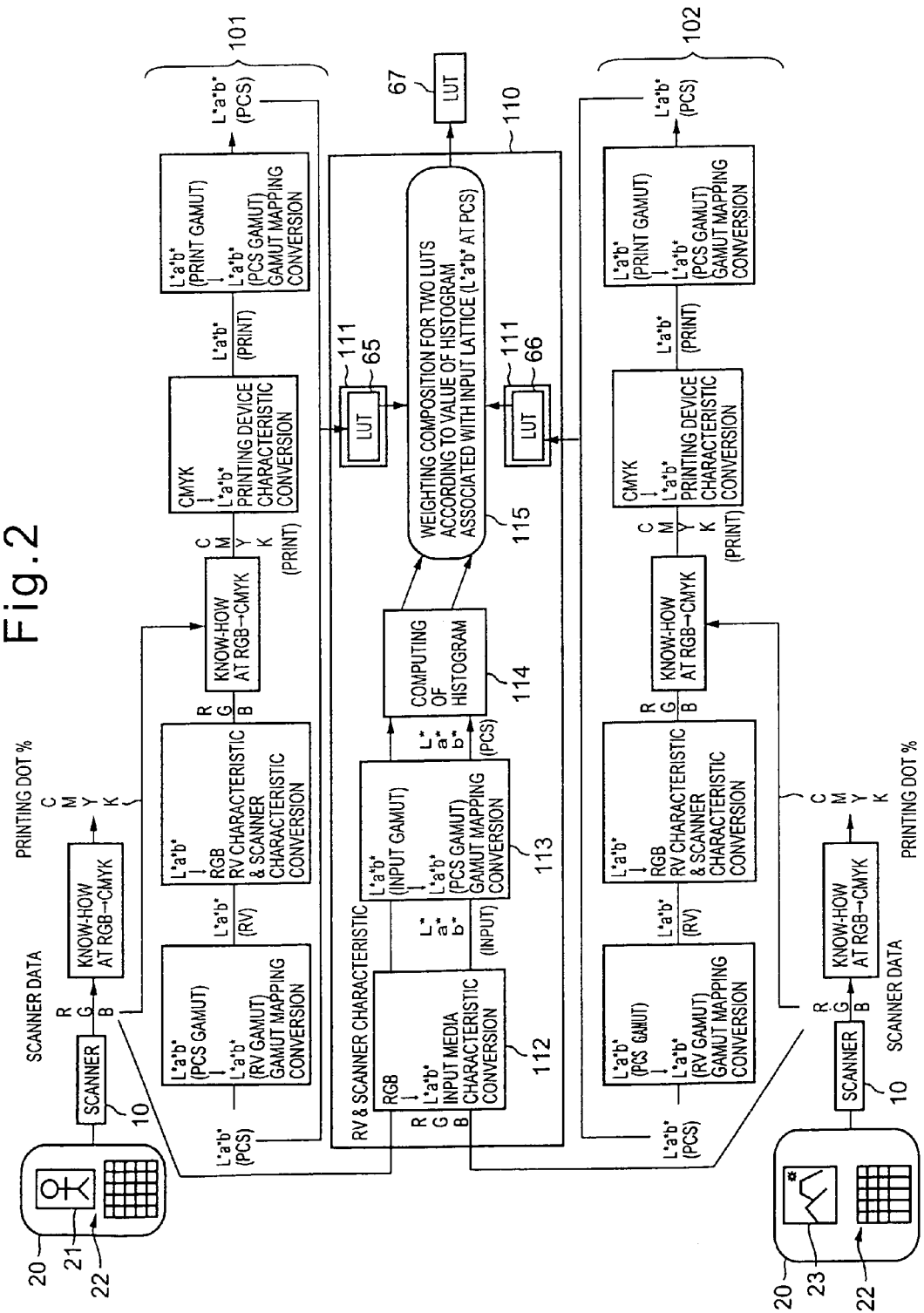
FIG. 2 is a view showing one embodiment of a color correction definition producing apparatus of the present invention, which is adapted to execute one embodiment of a color correcting definition producing method of the present invention.

FIG. 2 is a view showing one embodiment of a color correction definition producing apparatus of the present invention, which is adapted to execute one embodiment of a color correcting definition producing method of the present invention.

In FIG. 2, there are shown two procedures 101 and 102 which are completely same as the procedure 100 in the color correction method shown in FIG. 1, in which the know-how 40 is extracted, and the know-how 50 is derived to produce the LUT 60. However, those two procedures are different from one another in the sort of a general image to be referred to when an operator operates REGB data. More in detail, according to the procedure 101, a portrait image 21 is referred to. On the other hand, according to the procedure 102, a landscape image 23 is referred to. Therefore, LUT 65, which is produced according to the procedure 101, can reproduce a suitable color correction for skin color and the like for instance including the portrait image 21. And LUT 66, which is produced according to the procedure 102, can reproduce a suitable color correction for green and the like for instance including the landscape image 23.

The LUT 65 and 66 are fed to receiving sections 111 of a color correction definition producing apparatus 110 which is one embodiment of a color correction definition producing apparatus of the present invention. The color correction definition producing apparatus 110 is implemented by the computer system.

The color correction definition producing apparatus 110 also receives RGB data for each pixel constituting the portrait image 21 and the landscape image 23, respectively, which are obtained through reading the portrait image 21 and the landscape image 23 by the scanner 10. The color correction definition producing apparatus 110 applies to those RGB data an input media characteristic conversion 112 corresponding to the reverse conversion of the RV & scanner characteristic conversion 41 shown in FIG. 1 and a gamut mapping conversion 113 corresponding to the reverse conversion of the gamut mapping conversion 51 shown in FIG. 1, so that coordinate values on the PCS associated with those RGB data. Next, the color correction definition producing apparatus 110 applies a statistical processing to the coordinate values thus obtained, so that a histogram representative of a degree of deviation of colors constituting the portrait image 21 and the landscape image 23 on the color space is computed by a computing section 114 which is an example of the applying means referred to in the present invention. And thereafter, a synthesizing section 115 applies to the two LUTs 65 and 66 the weighting synthesizing based on the computed histogram so that a LUT 67 is produced. Details of the histogram and the weighting synthesizing will be described later.

The LUT 67 thus produced is capable of reproducing a suitable color correction for both the portrait image 21 and the landscape image 23. Such LUT 67 is incorporated into the computer system 70 instead of the LUT 60 shown in FIG. 1, and the color correction is carried out in accordance with the above-mentioned procedure. Thus, both the portrait image 21 and the landscape image 23 can be modified to images each having a preferable tone of color.

Figure 3:
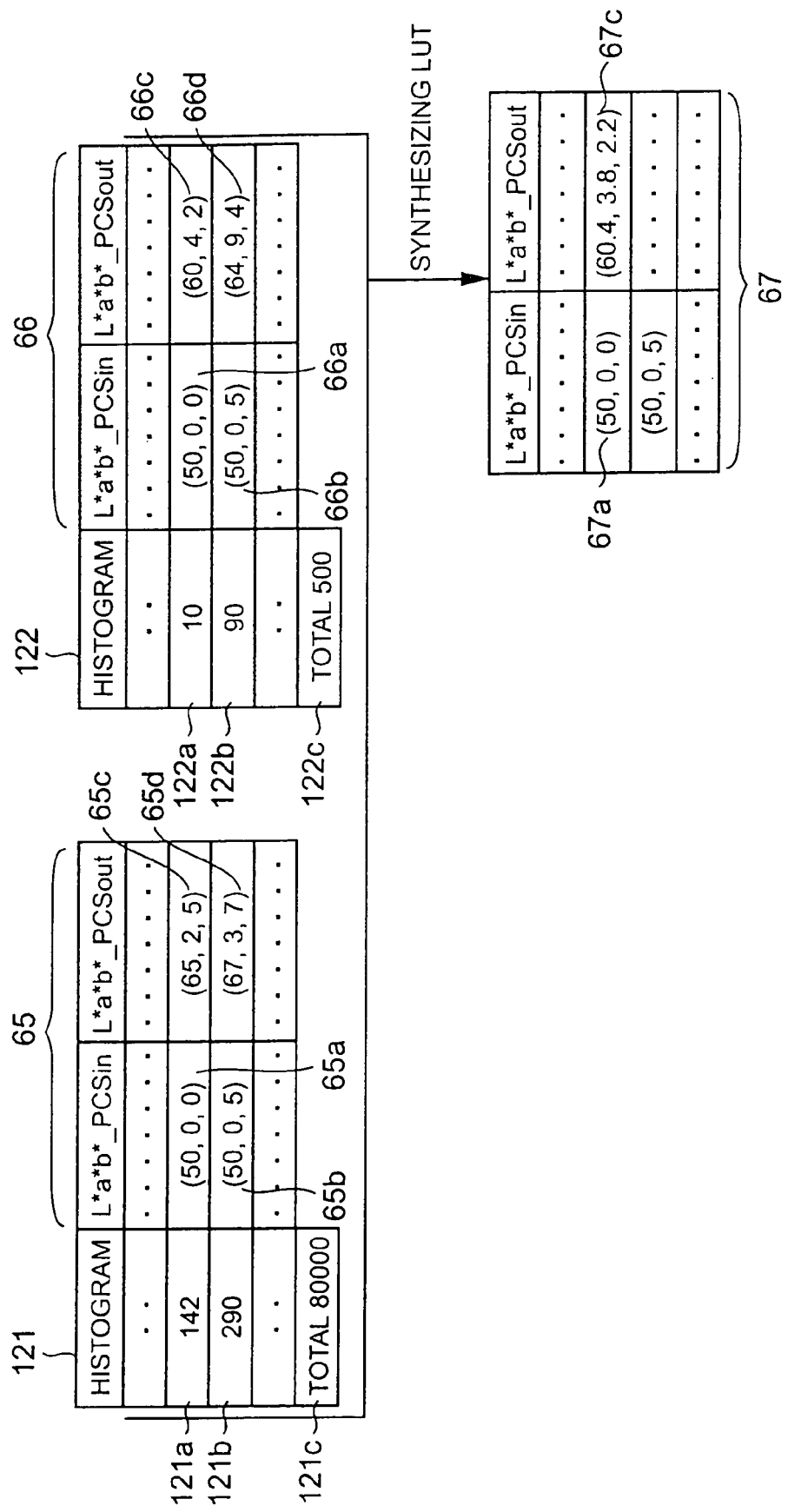
FIG. 3 is an explanatory view useful for understanding a weighting synthesizing based on a histogram.

FIG. 3 is an explanatory view useful for understanding a weighting synthesizing based on a histogram.

FIG. 3 shows by way of example two LUTs 65 and 66 fed to the color correction definition producing apparatus 110 shown in FIG. 2 and in addition histograms 121 and 122 of images referred to when the LUTs 65 and 66 are produced in association with the LUTs 65 and 66, respectively. The histograms 121 and 122 show the number of pixels 121a, 121b, and 122a, 122b, respectively, wherein color of pixels exists in each of divided sections in which a color space is divided as a lattice, and also show totals 121c and 122c of the number of pixels, respectively. The divided sections are associated with coordinate values 65a, 65b, 66a and 66b of the input side of the LUTs 65 and 66, and the number of pixels 121a, 121b, 122a and 122b are associated with coordinate values 65a, 65b, 66a and 66b of the input side of the LUTs 65 and 66.

As a technique for composing two LUTs 65 and 66, here, a so-called weighted mean is used. That is, first, as weight of sets of coordinate values (65a, 65c), (65b, 65d), and (66a, 66c), (66b, 66d) at input side and output side, which constitute two LUTs 65 and 66, respectively, the ratio of numbers of pixels 121a, 122a; 121b, 122b, which are associated with coordinate values 65a, 66a; 65b, 66b at the input side, to the totals 121c, 122c of the numbers of pixels are obtained from the computing section. Next, of sets (65a, 65c), (65b, 65d), (66a, 66c), (66b, 66d) sets, wherein coordinate values at the input side are the same between two LUTs 65 and 66, are associated with one another. Finally, coordinate values 65c, 66c; 65d, 66d at the output side are subjected to weighted mean for each of pairs of sets (65a, 65c), (66a, 66c); (65b, 65d), (66b, 66d) which consist of sets mutually associated with one another. For example, weight of sets of coordinates (65a, 65c), (66a, 66c), wherein coordinate values at the input side are given by (50, 0, 0), are expressed by values ⌈142/80000⌉, and ⌈10/500⌉, respectively. Coordinate values 67c at the output side of a set (67a, 67c) of coordinate values in the LUT 67, in which those sets (65a, 65c), (66a, 66c) are composed, are computed in accordance with coordinate values (65, 2, 5) (60, 4, 2) at the output side in two LUTs 65 and 66, using the following formula.

$$((65 \times 142/80000 + 60 \times 10/500)/(142/80000 + 10/500),$$
$$(2 \times 142/80000 + 4 \times 10/500)/(142/80000 + 10/500),$$
$$(5 \times 142/80000 + 2 \times 10/500)/(142/80000 + 10/500)) = (60.4, 3.8, 2.2)$$

In this manner, weighted mean is applied to coordinate values at the output side, so that there is produced an LUT 67 in which the LUTs 65 and 66 are synthesized.

Hereinafter, there will be explained alternative embodiments of the present invention. But only the different points from the above-mentioned embodiment will be described and redundant explanation will be omitted.

Figure 4:
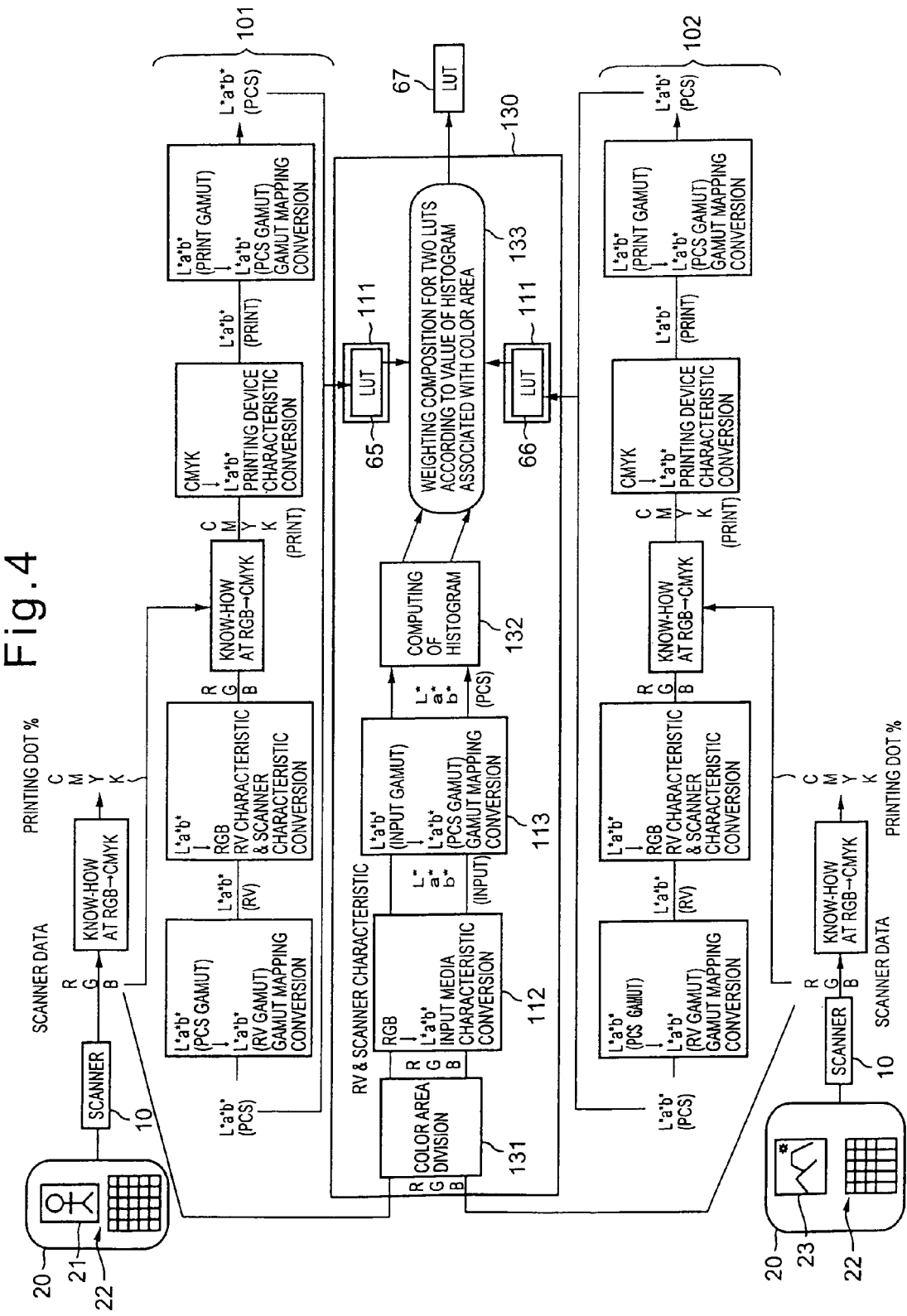
FIG. 4 is a view showing an alternative embodiment of a color correction definition producing apparatus of the present invention, which is adapted to execute an alternative embodiment of a color correcting definition producing method of the present invention.

FIG. 4 is a view showing an alternative embodiment of a color correction definition producing apparatus of the present invention, which is adapted to execute an alternative embodiment of a color correcting definition producing method of the present invention.

FIG. 4 shows a color correction definition producing apparatus 130 instead of the color correction definition producing apparatus 110 shown in FIG. 2. In a similar fashion to that of FIG. 2, the LUTs 65 and 66 are fed to the receiving sections 111.

According to the color correction definition producing apparatus 130, before the input media characteristic conversion 112, a color area division 131 is executed so that a color reproducing area on an RGB color space of the scanner 10 is divided into a plurality of color areas.

Figure 5:
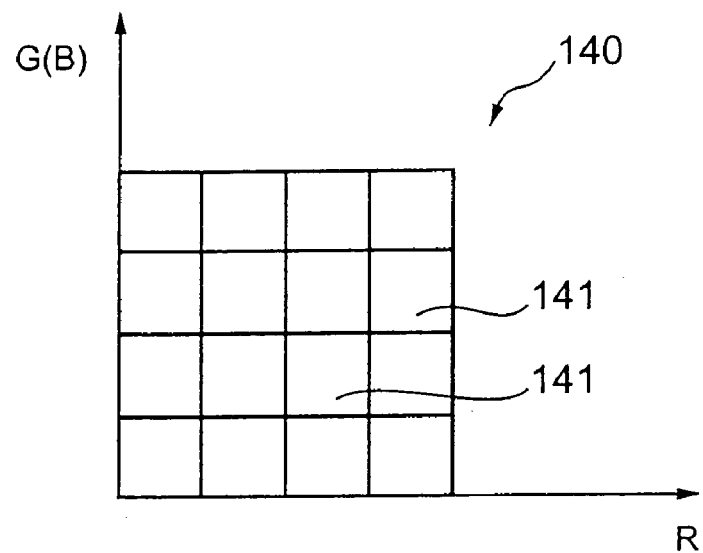
FIG. 5 is a conceptual view showing a plurality of color areas on an RGB color space.

FIG. 5 is a conceptual view showing a plurality of color areas on an RGB color space.

In FIG. 5, an RGB color space is represented on a two-dimensional basis, and a color reproducing area 140 of the scanner is expressed in form of a cub on the RGB color space. When the color area division 131 shown in FIG. 4 is executed, the color reproducing area 140 is divided on an equal division basis into a plurality of color areas 141 of a cubic type.

After the color area division 131 shown in FIG. 4 is executed, the RGB data are subjected to the input media characteristic conversion 112 and the gamut mapping conversion 113 so that coordinate values on the standard color reproducing area PCS, which correspond to the RGB data, are derived. At that time, the color areas 141 on the RGB color space are converted into the color areas on the standard color reproducing area PCS.

Figure 6:
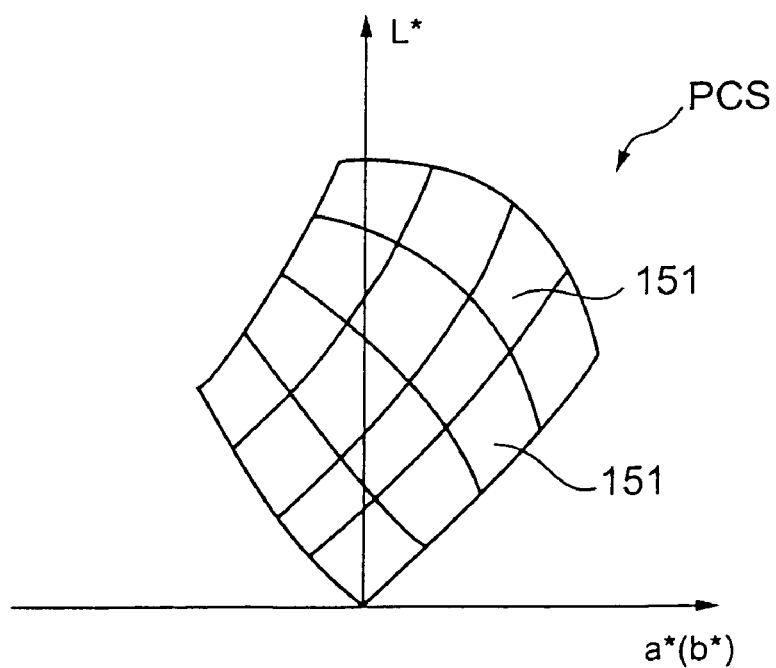
FIG. 6 is a conceptual view showing color areas on an Lab color space.

FIG. 6 is a conceptual view showing color areas on an Lab color space.

In FIG. 6, an Lab color space is represented on a two-dimensional basis, and a standard color reproducing area PCS is expressed in form of a distorted cub on the Lab color space. The standard color reproducing area PCS is divided into color areas 151 which is converted from the color areas 141 shown in FIG. 5.

A computing section 132 of the color correction definition producing apparatus 130 shown in FIG. 4 is an example of applying means referred to in the present invention, and computes the above-mentioned histograms for each color area on the standard color reproducing area PCS. Computing the histograms for each color area is preferable in the point that histograms based on data the number of which is sufficient for performing the statistical processing can be obtained. In a synthesizing section 133, weighting synthesizing based on the histogram computed for each color area is applied to the LUT 65 and 66 to generate a single LUT 67. The color correction based on the LUT 67 thus generated also makes it possible to modify both the above-mentioned portrait image 21 and landscape image 23 to images having the preferable tone of color.

As the synthesizing step referred to in the present invention, it is acceptable that the histogram computed for each color area is converted to weight in the present form in a similar fashion to that of the explanation referring to FIG. 3, and the weighting synthesis is performed with the converted weight. However, in the synthesizing section 133 shown in FIG. 4, in order to avoid discontinuity at the boundary of the color areas, the following synthesizing is performed.

Figure 7:
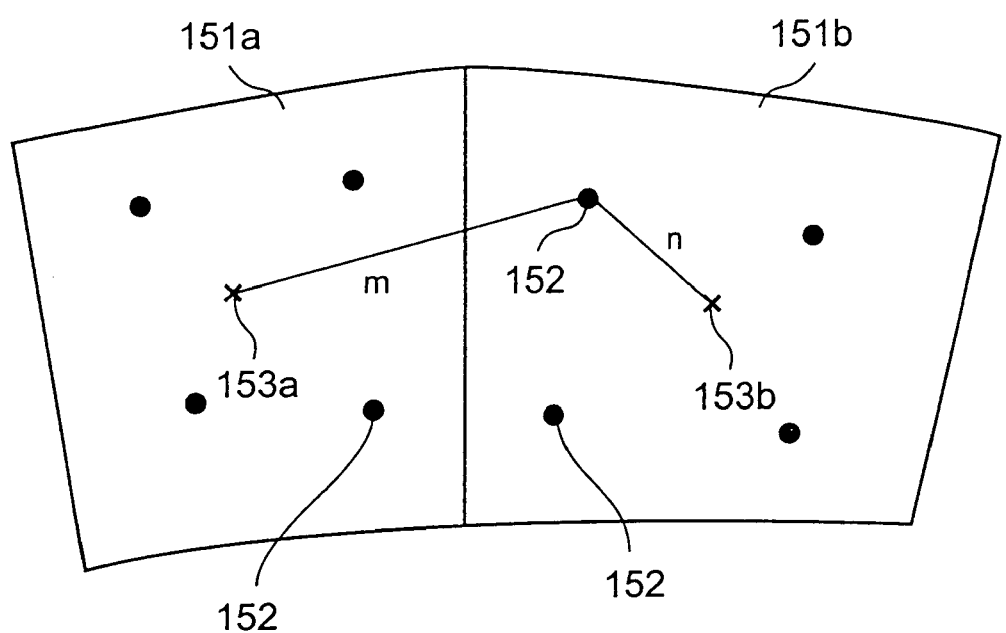
FIG. 7 is an explanatory view useful for understanding a weighting synthesizing section of an alternative embodiment.

FIG. 7 is an explanatory view useful for understanding a weighting synthesizing in the synthesizing section 133 shown in FIG. 4.

Here, for the purpose of simplification of the explanation, there will be explained a case where only adjacent two color areas are considered. But actually there is a need to consider a plurality of color areas adjacent to one another in a color space with respect to a certain color area.

FIG. 7 shows two color areas 151a and 151b of interest. In the color areas 151a and 151b, there are shown points 152 corresponding to coordinate values at the output sides of the LUTs before synthesized, and central points 153a and 153b of the color areas 151a and 151b, respectively.

Synthesizing of the LUTs is performed through weighted mean of coordinate values at the output sides. Here, as weight c used in the weighted mean, there is used weight in which weight p and q converted from the histograms of the color areas 151a and 151b are synthesized based on distances m and n between the points 152 corresponding to coordinate values at the output sides of the LUTs and the central points 153a and 153b of the color areas 151a and 151b, respectively, in accordance with the following formula.

$$c=(p \times n+q \times m)/(m+n)$$

In this manner, when the weight c based on the distances m and n is used in the synthesizing section 133 shown in FIG. 4, it is possible to obtain a suitable LUT 67 free from discontinuity at the boundary of the color areas 151a and 151b.

Incidentally, according to the above-mentioned embodiments, the weighted mean is performed with weight according to the histogram. However, it is acceptable that the color correction definition producing apparatus of the present invention receives weight for each LUT and perform weighted mean using the received weight, or alternatively a plurality of LUTs are simply averaged. Further, for example, it is acceptable that weight of [1] or [0] is applied to a set of coordinate values according as one coordinate values of the set are concerned with coordinate values within a predetermined color area, so that two LUTs are separated.

Further, here, weighted mean is performed for each pair of sets consisting of sets in which coordinate values at the input side are identical with one another, however, according to the color correction definition producing apparatus of the present invention, it is acceptable that weighted mean is performed for each pair of sets consisting of sets in which coordinate values at the output side are identical with one another.

Furthermore, here, while there is used a technique referred to as the weighted mean, it is acceptable that the color correction definition producing apparatus of the present invention adopt a technique referred to as the coordinate rotation and the like.

Figure 8:
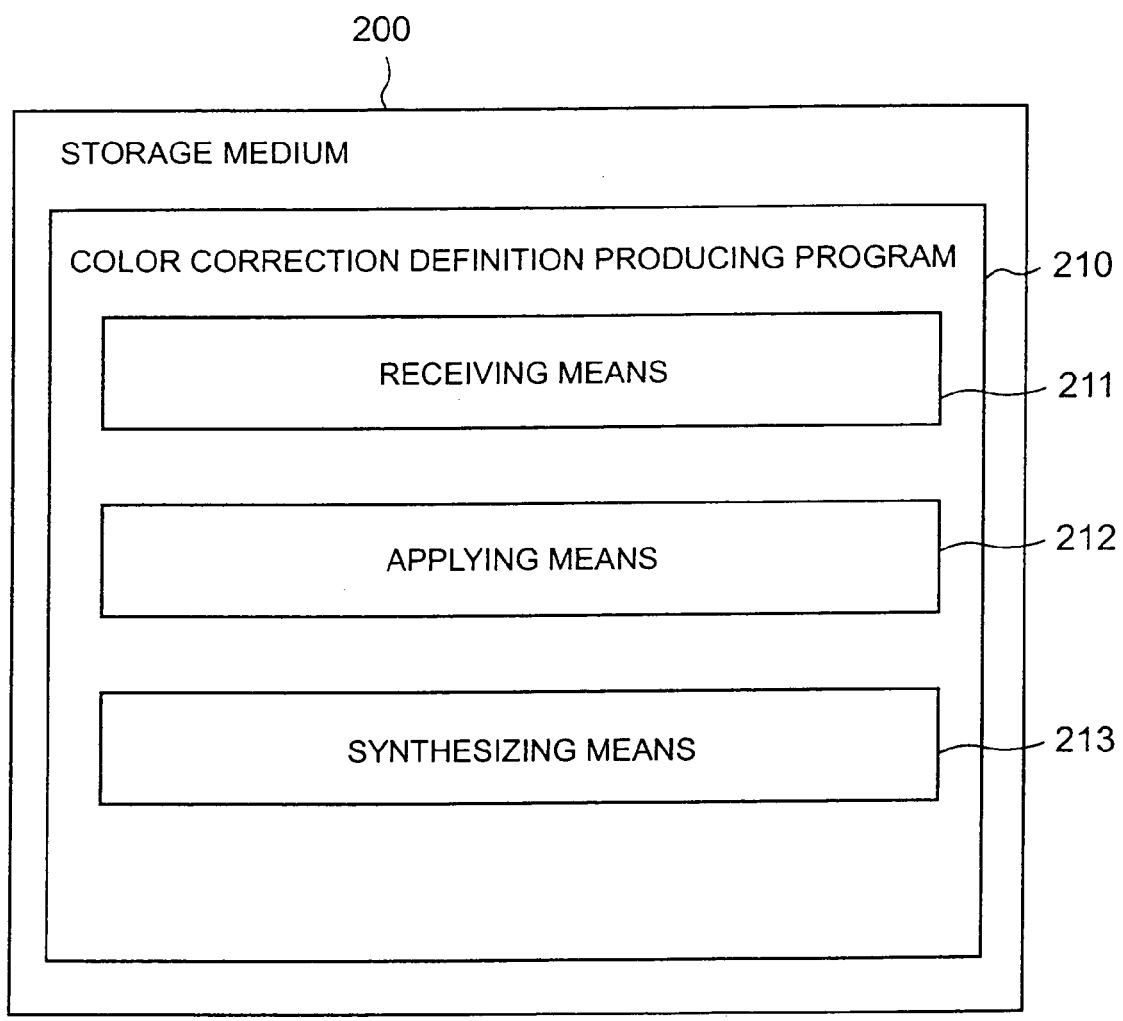
FIG. 8 is a view showing one embodiment of a color correction definition producing program storage medium of the present invention.

FIG. 8 is a view showing one embodiment of a color correction definition producing program storage medium of the present invention.

With respect to a storage medium 200 shown in FIG. 8, any one is acceptable, as the storage medium, which stores a color correction definition producing program 210, regardless of a type of the storage medium. For example, in the event that the color correction definition producing program 210 is stored in a CD-ROM, the CD-ROM is the storage medium. On the other hand, in the event that the color correction definition producing program 210 is stored in a hard disk device onto which the color correction definition producing program 210 is loaded, the hard disk is the storage medium, or alternatively, in the event that the color correction definition producing program 210 is loaded down onto a floppy disk, the floppy disk is the storage medium.

Here, the color correction definition producing program 210 stored in storage medium 200 shown in FIG. 8 includes receiving means 211, applying means 212, synthesizing means 213, and other various types of means. The receiving means 211, the applying means 212 and the synthesizing means 213 constitute a software section of the receiving section 111, the computing section 114 and the synthesizing section 115 shown in FIG. 2. The receiving means 211 is means for receiving color correction definitions (LUT), the applying means 212 is means for applying weight to the color correction definitions (LUT), and the synthesizing means 213 is means for synthesizing the color correction definitions (LUT) using the weight.

Other various types of means constituting the color correction definition producing program 210 shown in FIG. 8 include, for example, means for performing the input media characteristic conversion 112 and the gamut mapping conversion 113 shown in FIG. 2.

As mentioned above, according to color correction definition producing method and apparatus of the present invention, it is possible to produce a color correction definition reproducing a suitable color correction common to a plurality of types of images.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color correction definition producing method comprising:
   a receiving step of receiving a plurality of color correction definitions each for defining an association among coordinate values on a color space with respect to colors before and after color correction between an original image and a modified image subjected to a color correction for the original image;

an applying step of applying weight to the color correction definitions derived in said receiving step; and a synthesizing step of synthesizing a plurality of color correction definitions derived in said receiving step in accordance with weight applied in said applying step.

2. A color correction definition producing method according to claim 1, wherein said receiving step receives a plurality of color correction definitions in such a manner that the plurality of color correction definitions are associated with color corrections associated with a predetermined plurality of original images, and said applying step applies weight to the color correction definitions in accordance with a relative importance of the original images with which the color correction definitions are associated.

3. A color correction definition producing method according to claim 1, wherein said applying step applies weight for a plurality of color areas on the color space to the color correction definitions.

4. A color correction definition producing method according to claim 1, wherein said applying step applies to the color correction definitions weight for each set of coordinate values defined in association there between by the plurality of color correction definitions derived in said receiving step, and said synthesizing step performs a mapping of the sets among the plurality of color correction definitions, and synthesizes the mutually associated sets in accordance with weight applied in said applying step.

5. The color correcting definition producing method according to claim 1, wherein the synthesizing step further comprises:

computing a histogram for each color area; and converting the histogram computed for each color area to weight.

6. The method of claim 1, wherein the color correction definitions are set according to types of images corresponding to at least one of portrait images and landscape images.

7. The color correction definition producing method according to claim 1, wherein the color correction definition is capable of reproducing a suitable color correction common to a plurality of types of images.

8. The color correction definition producing method according to claim 7, wherein the plurality of types of images comprises portraits with skin tones and landscapes with green.

9. A color correction definition producing apparatus comprising:

receiving means for receiving a plurality of color correction definitions each for defining an association among coordinate values on a color space with respect to colors before and after color correction between an original image and a modified image subjected to a color correction for the original image;

applying means for applying weight to the color correction definitions derived in said receiving means; and synthesizing means for synthesizing a plurality of color correction definitions derived in said receiving means in accordance with weight applied in said applying means.

10. The color correction definition producing apparatus according to claim 9, wherein said synthesizing means computes a histogram for each color area and converts the histogram computed for each color area to weight.

11. The apparatus of claim 9, wherein the color correction definitions are set according to types of images corresponding to at least one of portrait images and landscape images.

12. A color correction definition producing apparatus, comprising:

a receiving section receiving a plurality of look up tables;

a computing section computing histograms used as an assembly of weight for sets of coordinate values constituting each of the look up tables; and a synthesizing section synthesizing the received plurality of look up tables using the computed weight.

13. The apparatus of claim 12, wherein said look up tables comprise color correction definitions.

14. A color correction definition producing program embodied on a computer-readable medium, the color correction definition producing program comprising:

a step of receiving a plurality of color correction definitions each for defining an association among coordinate values on a color space with respect to colors before and after color correction between an original image and a modified image subjected to a color correction for the original image;

a step of applying weight to the received color correction definitions ; and a step of synthesizing a plurality of received color correction definitions in accordance with the applied weight.

15. The color correction definition producing program according to claim 14, wherein the step of synthesizing further comprises:

computing a histogram for each color area; and converting the histogram computed for each color area to weight.

* * * * *